United States Patent
Kuan et al.

(10) Patent No.: US 9,672,592 B2
(45) Date of Patent: Jun. 6, 2017

(54) TILING-DISPLAY SYSTEM AND METHOD THEREOF

(71) Applicant: AOpen Inc., New Taipei (TW)

(72) Inventors: Chao-Chi Kuan, New Taipei (TW); Wen-Hsiung Chung, New Taipei (TW)

(73) Assignee: AOPEN INC., New Taipei (TW)

( * ) Notice: Subject to any disclaimer, the term of this patent is extended or adjusted under 35 U.S.C. 154(b) by 145 days.

(21) Appl. No.: 14/718,136

(22) Filed: May 21, 2015

(65) Prior Publication Data

US 2016/0292820 A1 Oct. 6, 2016

(30) Foreign Application Priority Data

Mar. 31, 2015 (TW) .............................. 104110577 A (51) Int. Cl.
| | | |
|---|---|---|
| *G09G 3/20* | (2006.01) | |
| *G06T 3/40* | (2006.01) | |
| *G06T 3/60* | (2006.01) | |
| *H04N 7/01* | (2006.01) | |
| *H04N 1/40* | (2006.01) | |
| *G06F 3/14* | (2006.01) | |

(52) U.S. Cl.
CPC .......... *G06T 3/4038* (2013.01); *G06F 3/1446* (2013.01)

(58) Field of Classification Search
CPC combination set(s) only.
See application file for complete search history.

(56) References Cited

U.S. PATENT DOCUMENTS

| 2006/0101054 A1* | 5/2006 | Dempski ................. G06F 9/542 |
| 2007/0179646 A1* | 8/2007 | Dempski ................... G06F 8/65 700/83 |
| 2010/0013738 A1* | 1/2010 | Covannon .......... H04N 5/23203 345/1.3 |
| 2011/0032365 A1* | 2/2011 | Yett .................... G02B 27/2235 348/207.1 |

FOREIGN PATENT DOCUMENTS

| TW | 200609857 | 3/2006 |
| TW | 201342202 | 10/2013 |
| TW | 201438000 | 10/2014 |

OTHER PUBLICATIONS

Office Action issued in corresponding Taiwan patent application on Dec. 15, 2015.

* cited by examiner

*Primary Examiner* — Wesner Sajous
(74) *Attorney, Agent, or Firm* — McClure, Qualey & Rodack, LLP (57) ABSTRACT

A tiling-display system includes an image source device, a splitter unit, a plurality of control units, and a plurality of display devices. The splitter unit receives a source image from the image source device and outputs a plurality of replication images. Each of the source image and the replication images has a first image size. The control units receive the replication images and generate sub-images according to groups of setting parameters. Each of the groups of setting parameter includes a scale, a shift and a rotation angle. The shifts of the group of the setting parameters are different from each other, and each of the plurality of sub-images has a second image size and the corresponding rotation angle. The display devices receive and display the sub-images from the control units. The display devices (Continued)

are arranged according to the rotation angle and display a tiled image.

16 Claims, 11 Drawing Sheets

TILING-DISPLAY SYSTEM AND METHOD THEREOF

CROSS-REFERENCES TO RELATED APPLICATIONS

This non-provisional application claims priority under 35 U.S.C. §119(a) on Patent Application No. 104110577 filed in Taiwan, R.O.C. on Mar. 31, 2015, the entire contents of which are hereby incorporated by reference.

BACKGROUND

Technical Field

The instant disclosure relates to a tiling-display system.

Related Art

The flat-panel display (FPD) has the advantages of low power consumption, low radiation and thin volume so that the flat-panel display has replaced the cathode ray tube (CRT) as the mainstream display technology. With advances in technology, the flat-panel display, due to its bigger size, gradually becomes popular in the field of consumer entertainment like the fields of home displaying, outdoor advertising, and exhibition. A common way to display a large size image is by the way of a television wall. The television wall is composed of multiple flat-panel displays tiled regularly.

The image to be displayed on the television wall is firstly divided into sub-images, and then the sub-images individually displayed by the flat-panel displays of the television wall. However, although the television wall can enlarge and display the source image, the resolution of the source image cannot be increased. Namely, images shown on each sub-image are not clear enough.

SUMMARY

In one embodiment, the tiling-display system comprises an image source device, a first port, a splitter unit, a plurality of control units, and a plurality of display devices. The image source device is used to output a source image. The first port is electrically connected to the image source device, and the splitter unit is electrically connected to the first port. The splitter unit is used to receive the source image through the first port and replicates the source image into a plurality of replication images so that the each of the source image and the replication images has a first image size. The control units correspond to a plurality of groups of setting parameters, respectively, and receive the replication images, respectively. Each of the control units processes the received replication images according to the corresponding group of setting parameters to generate a sub-image. Each of the plurality of groups of setting parameters comprises a scale, a shift and a rotation angle. The shifts of the plurality of the group of the setting parameter are different from each other, and each of the plurality of sub-images has a second image size and the corresponding rotation angle of the corresponding group of setting parameters. The display devices are electrically connected to the control units, respectively. Each of the display devices is used to receive and displays the sub-image generated by the corresponding control unit. Each of the plurality of display devices is arranged according to the corresponding rotation angle and the screens of the plurality of display devices display a tiled image.

In other embodiment, a method of tiled displaying comprises the following steps. Receiving a source image via a first port; replicating the source image into a plurality of replication images. Processing the replication images corresponding to a plurality of groups of setting parameters respectively to generate a plurality of sub-images; and outputting the sub-images to a plurality of display devices respectively via a plurality of second ports such that the display devices display the sub-images respectively. Each of the source image and the replication images has a first image size. Each group of the setting parameters comprises a scale, a shift and a rotation angle. The shifts of the plurality of the group of the setting parameters are different from each other. Each of the sub-images has a second image size and the corresponding rotation angle of the corresponding group of setting parameters. Each of the plurality of display devices is arranged according to the corresponding rotation angle and the screens of the plurality of display devices display a tiled image.

In summary, the instant disclosure provides a tiling-display system and a method of tiled displaying. The method can be adapted to display tiled image on display devices tiled irregularly. In addition, the tiling-display system and the method allow a user to input setting parameters to generate a sub-image for each of the display devices.

DETAILED DESCRIPTION

Figure 1:
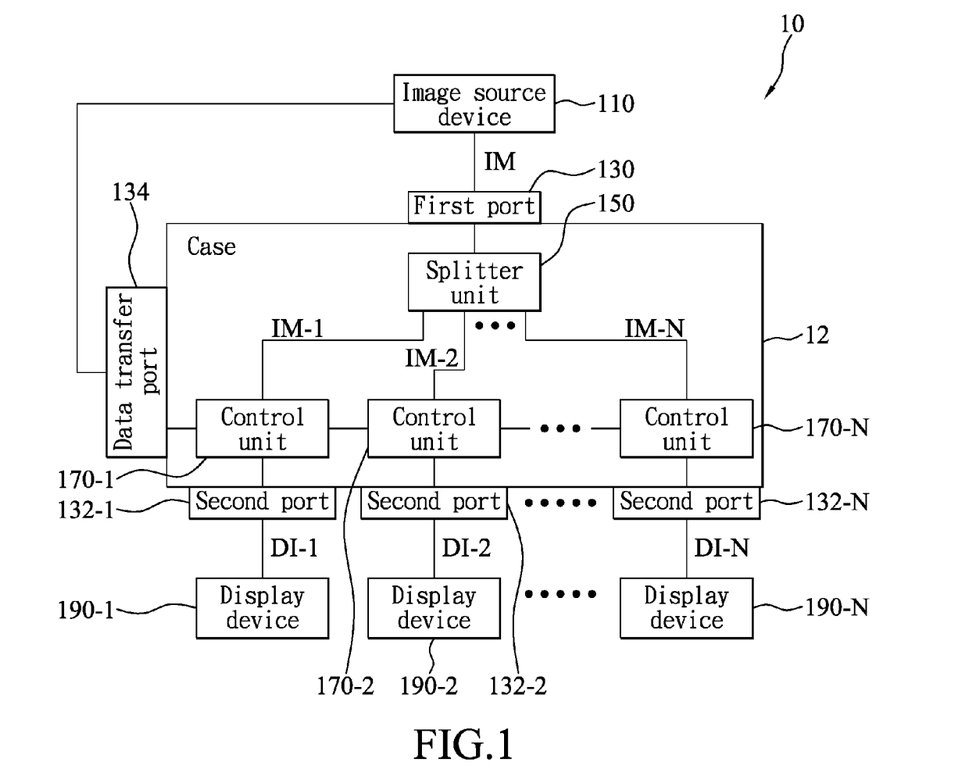
FIG. 1 illustrates a functional block diagram of a tiling-display system according to one embodiment of the instant disclosure.
Figure 2:
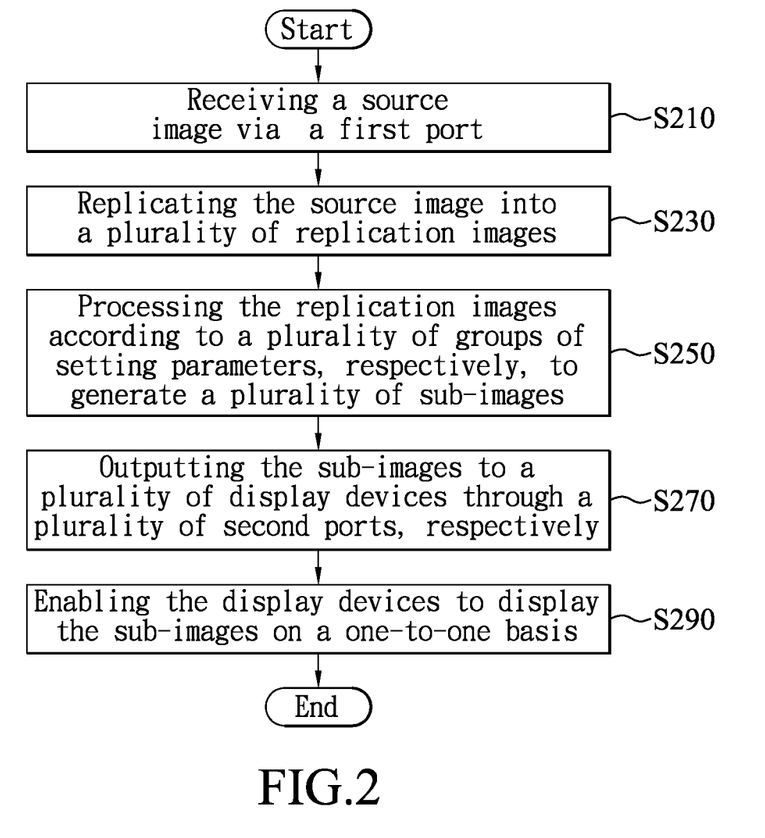
FIG. 2 is a flow chart illustrating a method of tiled displaying according to one embodiment of the instant disclosure.

FIG. 1 illustrates a functional block diagram of a tiling-display system according to one embodiment of the instant disclosure. FIG. 2 is a flow chart illustrating a method of tiled displaying according to one embodiment of the instant disclosure.

Please refer to FIG. 1. The tiling-display system 10 comprises an image source device 110, a first port 130, a splitter unit 150, a plurality of control units 170-1~170-N, and a plurality of display devices 190-1~190-N. The image source device 110 is electrically connected to the splitter unit 150 through the first port 130. The splitter unit 150 is electrically connected to the input terminals of the plurality of control units 170-1~170-N, and the output terminals of the plurality of control units 170-1~170-N are electrically connected to the display devices 190-1~190-N, respectively. In other words, each control unit is electrically connected between the splitter unit 150 and the corresponding display device. For example, the control unit 170-1 is electrically connected between the splitter unit 150 and the corresponding display device 190-1, the control unit 170-2 is electrically connected between the splitter unit 150 and the corresponding display device 190-2, and so forth. N is an integer larger than or equal to 2.

Please refer to FIG. 1 accompanied with FIG. 2. The image source device 110 outputs a source image IM. The splitter unit 150 receives the source image IM from the image source device 110 via the first port 130 (step S210). Then, the splitter unit 150 replicates the source image IM into a plurality of replication images IM-1~IM-N according to the number of the control units 170-1~170-N (step S230) and outputs the replication images IM-1~IM-N to the control units 170-1~170-N. Therefore, each of the source image IM and the replication images IM-1~IM-N have a first image size. The replication images may be obtained by splitting the source image IM and have the same image size, the same image content and the same resolution as the source image IM while the signal intensity of the replication images may be smaller than the source image IM.

The control units 170-1~170-N correspond to a plurality of groups of setting parameters, respectively. Each of control units processes the received replication image to generate a sub-image according to the corresponding group of setting parameter (step S250). For example, the control unit 170-1 receives the corresponding replication image IM-1 and processes the corresponding replication image IM-1 to generate a sub-image DI-1 according to the corresponding group of the setting parameters; the control unit 170-2 receives the corresponding replication image IM-2 and processes the corresponding replication image IM-2 to generate a sub-image DI-2 according to the corresponding group of the setting parameters; and so forth. Each group of the setting parameters comprises a scale, a shift and a rotation angle, and the shifts of groups of the setting parameters are different from each other. Each of the plurality of sub-images, respectively, generated by the control units has a second image size and a corresponding rotation angle. The second image size is smaller than the first image size.

Each display device receives and displays the sub-image generated by the corresponding control unit. In the embodiment, each display device is arranged according to the corresponding rotation angle, and the display devices 190-1~190-N are tiled to form a tiled image which has a size larger than or equal to the first image size. In other words, each display device has a disposing angle, and the disposing angle is related to the corresponding rotation angle. In some embodiments, the disposing angle of each display device is equal to the corresponding rotation angle such that the second image size is dependent on the number of the display device, and disposing angles. In some embodiments, the second image size is further dependent on other parameters. The scale is dependent on the first resolution, the image size of the tiled image, the ratio of the second image size to the first image size. In some embodiments, the scale is further dependent on other parameters.

In some embodiments, the tiling-display system 10 can further comprise a plurality of the second port 132-1~132-N. The second port 132-1~132-N are electrically connected to the control units 170-1~170-N, respectively, and electrically connected, respectively, to the display devices 190-1~190-N. In other words, each second port electrically is electrically connected between the output terminal of the corresponding control unit and the corresponding display device. For example, the output terminal of the control unit 170-1 is connected to the display devices 190-1 through the second port 132-1; the output terminal of the control unit 170-2 is connected to the display devices 190-2 through the second port 132-2, and so forth. Therefore, the control units 170-1~170-N output the sub-images to the display devices 190-1~190-N respectively via the second ports 132-1~132-N (step 270), so that the display devices 190-1~190-N display the sub-images DI-1~DI-N, respectively (step 290). In other words, each display device receives the sub-image generated by the corresponding control unit through the corresponding second port.

In some embodiments, the splitter unit 150 and the control units 170-1~170-N are disposed in a same case 12 to form an image-dividing device. The first port 130 and the second port 132-1~132-N are disposed on the case 12 so that the image-dividing device can be connected to the exterior image source device 110 through the first port 130 and be connected to the exterior display devices 190-1~190-N through the second ports 132-1~132-N.

In some embodiments, the image source device 110 can be a computing device, a media player, or a game console. The computing device can be an electronic device which operates an operation system executing an application; such as a personal computer, a notebook, a cell phone, a tablet PC, a server, etc.

In some embodiments, the image source device 110 is the computing device and can output the plurality of groups of setting parameters to the control units 170-1~170-N in addition to output the source image IM to the splitter unit 150.

Figure 3:
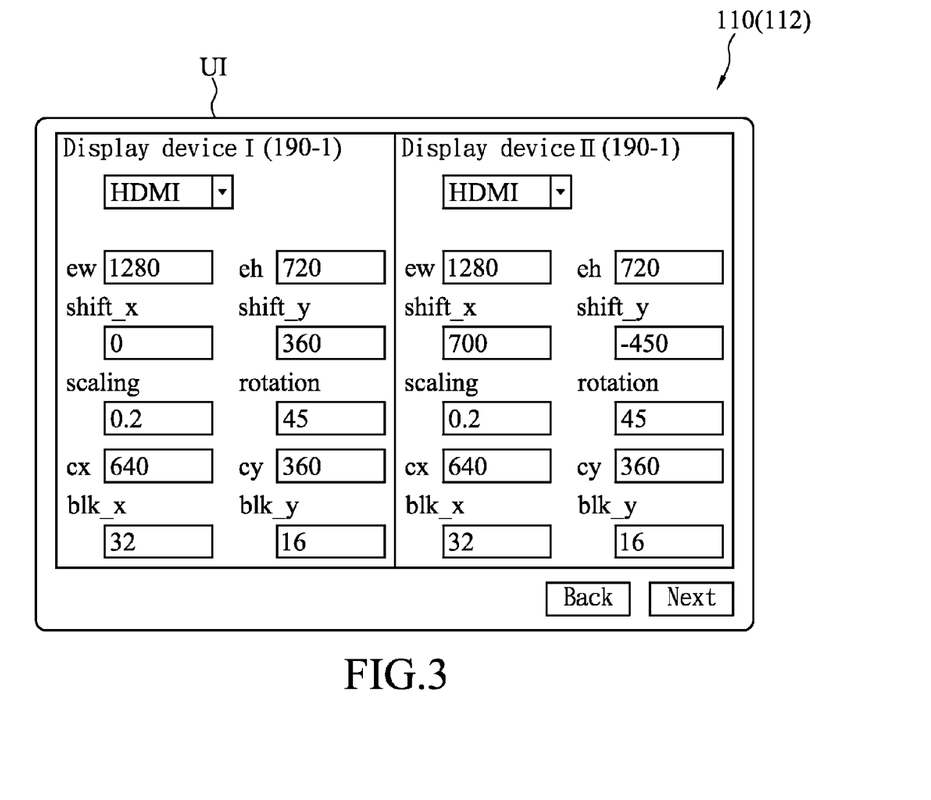
FIGS. 3 and 4 are a schematic diagram of an user interface according to one embodiment of the instant disclosure.
Figure 4:
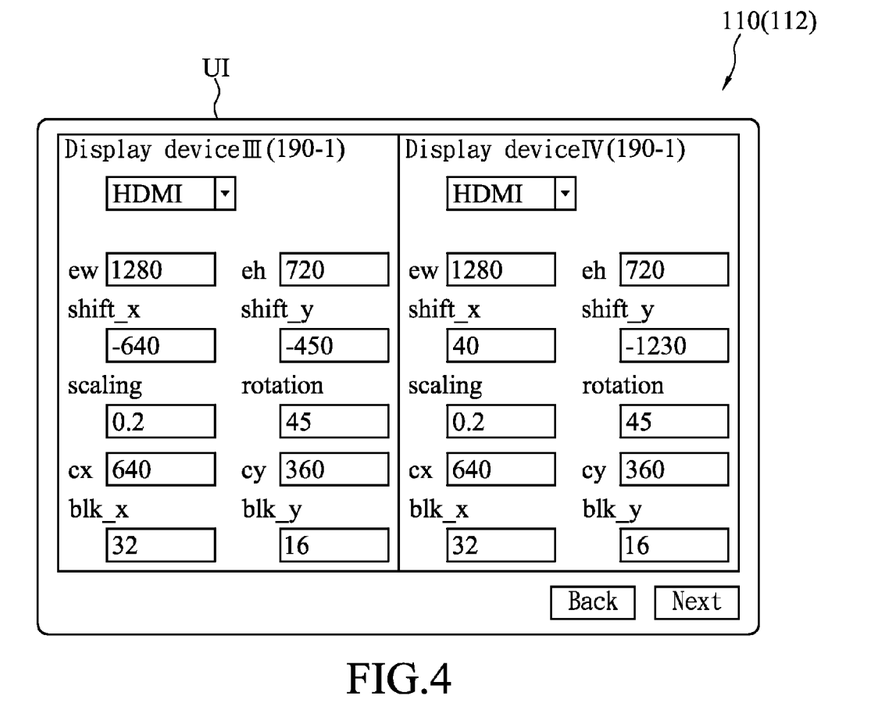

The tiling-display system 10 can further comprise a data transfer port 134, as shown in FIG. 1. The image source device 110 can be electrically connected to the control units 170-1~170-N through the data transfer port 134. The image source device 110 can generate the plurality of groups of setting parameters by using an user interface UI (as shown in FIGS. 3 and 4) and transfers the plurality of groups of generated setting parameters to the control units 170-1~170-N, respectively, via the data transfer port 134. Each group of the setting parameters comprises a scale (Scaling), a shift (Shift_x, Shift_y), and a rotation angle (Rotation). Moreover, each group of setting parameters may further comprise reference coordinates (blk_x, blk_y) as the reference for rotating the image.

In some embodiments, the image source device 110 can receive the plurality of groups of setting parameters corresponding to the display devices 190-1~190-N, respectively via the user interface UI. Each control unit receives one group of the corresponding setting parameters through the data transfer port 134.

In other embodiments, the image source device 110 can receive the plurality of input values corresponding to the display devices 190-1~190-N respectively via the user interface UI. The image source device 110 transforms the plurality of input values into the plurality of groups of setting parameters corresponding to the display devices 190-1~190-N respectively by preset algorithms. Each control unit receives one group of the corresponding setting parameters through the data transfer port 134.

Figure 5:
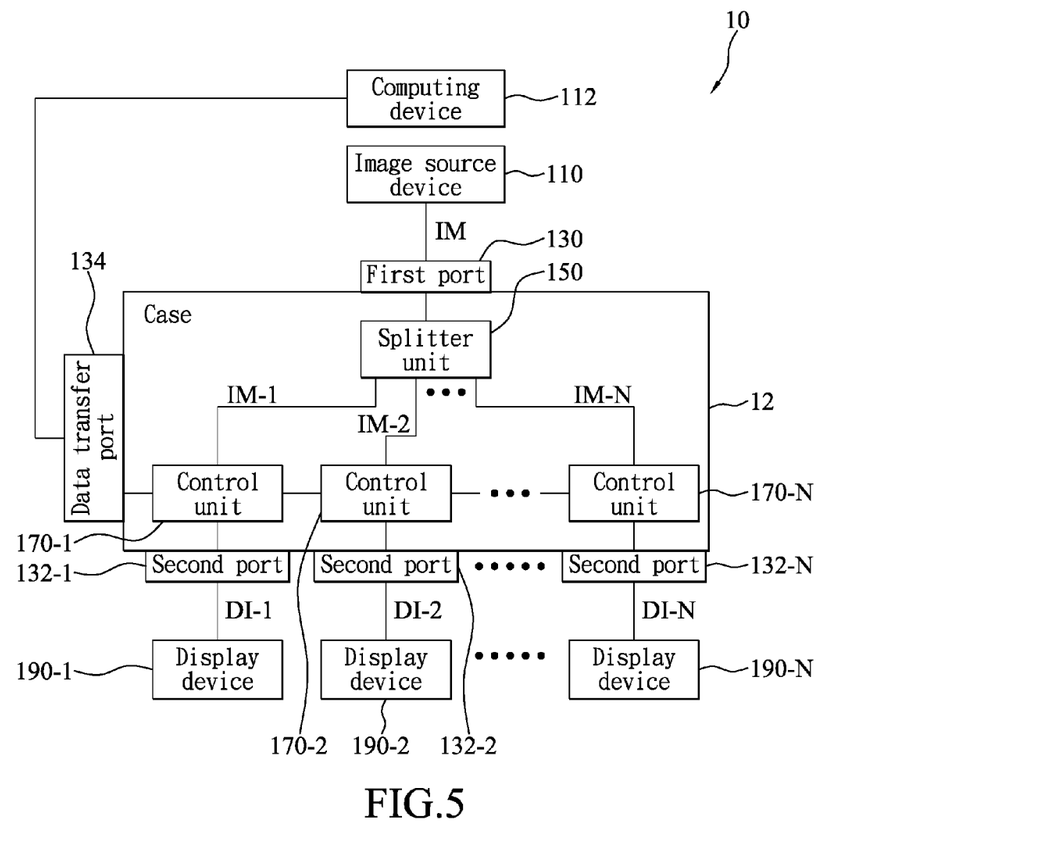
FIG. 5 illustrates a functional block diagram of a tiling-display system according to another embodiment of the instant disclosure.

In some embodiments, the tiling-display system 10 can further comprise a computing device 112, as shown in FIG.

5. The computing device 112 generates and outputs the plurality of groups of the setting parameters to the control units 170-1~170-N. The computing device 112 can generate the plurality of groups of setting parameters by using the user interface UI (as shown in FIGS. 3 and 4) and transfers the plurality of groups of setting parameters to the control units 170-1~170-N respectively via the data transfer port 134. The way that the computing device 112 generates the setting parameters can be as same as the way mentioned-above and its details are not addressed again here.

In some embodiments, the data transfer port 134 is disposed on the case 12 so that the image-dividing device can be connected to the exterior image source device 110 or the computing device 112 through the data transfer port 134.

In some embodiments, the tiling-display system 10 can further comprise a storage unit (not shown), and the storage unit stores the plurality of groups of setting parameters provided by the image source device 110 or the computing device 112. When processing the replication images, the control units 170-1~170-N reads the corresponding setting parameters from the storage unit.

In some other embodiments, each control units 170 can further comprise a storage unit (not shown) and a processing module (not shown). Corresponding to each of control units 170, the processing module receives one group of the corresponding setting parameters provided by the image source device 110 or the computing device 112 through the data transfer port 134 and stores the group of the corresponding setting parameters in the corresponding storage unit (corresponding to the control unit 170). When processing the replication images, the processing module reads the group of corresponding setting parameters from the corresponding storage unit.

In some embodiments, the tiled image DF (shown as an area surrounded by a dotted line) tiled by the display devices 190-1~190-N is a non-rectangular plane geometric figure (shape), as shown in FIGS. 6 to 11. In other words, the display devices 190-1~190-N may be irregularly tiled, as shown in FIGS. 6 to 11.

In some embodiments, each of display devices 190-1~190-N has a rectangular display screen, as shown in FIGS. 6 to 10.

Figure 11:
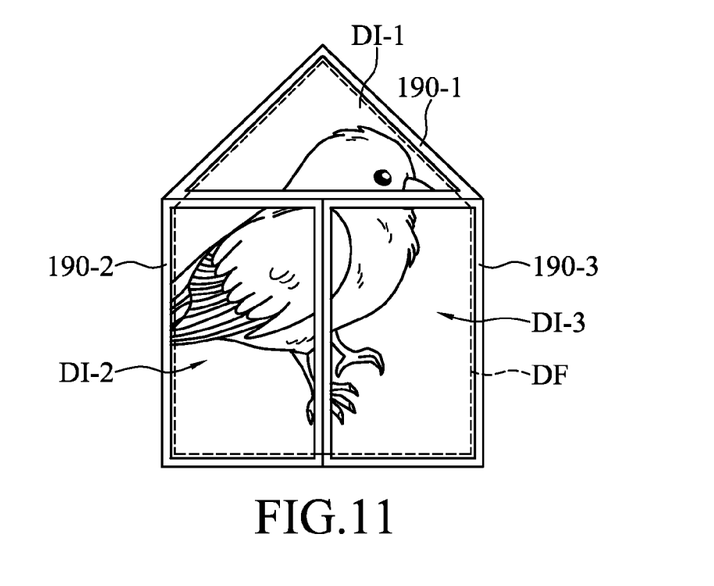
FIG. 11 is a schematic diagram of the sixth embodiment of the display devices tiled irregularly.

In some other embodiments, at least one of the display devices 190-1~190-N has a non-rectangular display screen, as shown in FIG. 11.

Figure 6:
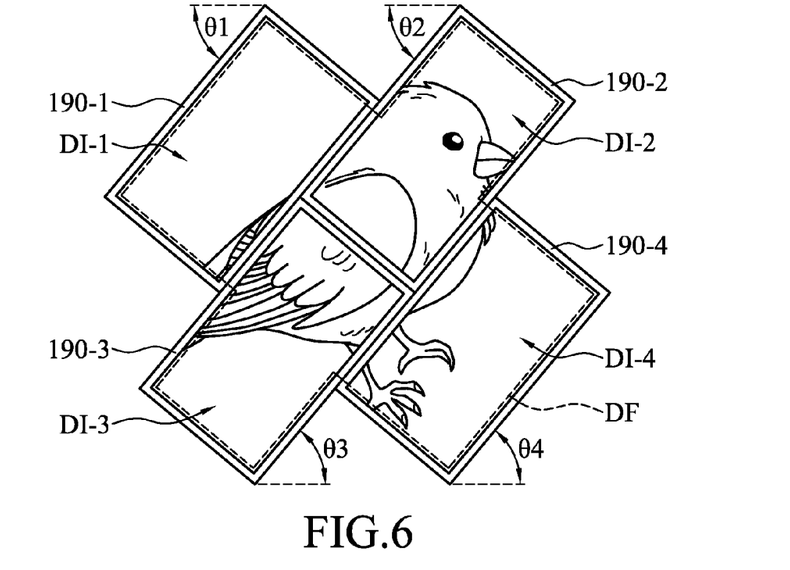
FIG. 6 is a schematic diagram of the first embodiment of the display devices tiled irregularly.
Figure 9:
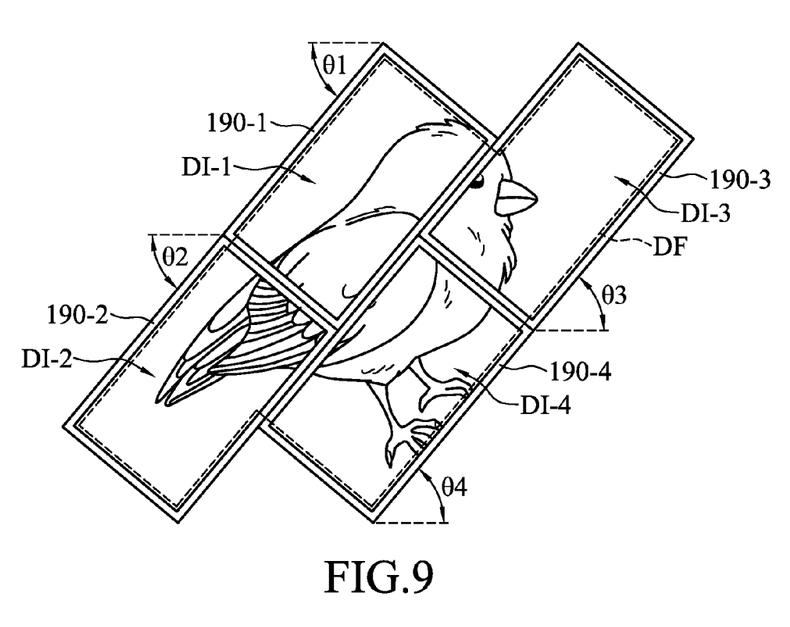
FIG. 9 is a schematic diagram of the fourth embodiment of the display devices tiled irregularly.

In some embodiments, the rotation angles (Rotation) corresponding to the disposing angles θ1~θ4 respectively are the same, as shown in FIGS. 6 and 9. If each of display screens of the display devices 190-1~190-N has the same shape and the rotation angles (Rotation) are the same, the rotation angles (Rotation) are not equal to zero.

Figure 7:
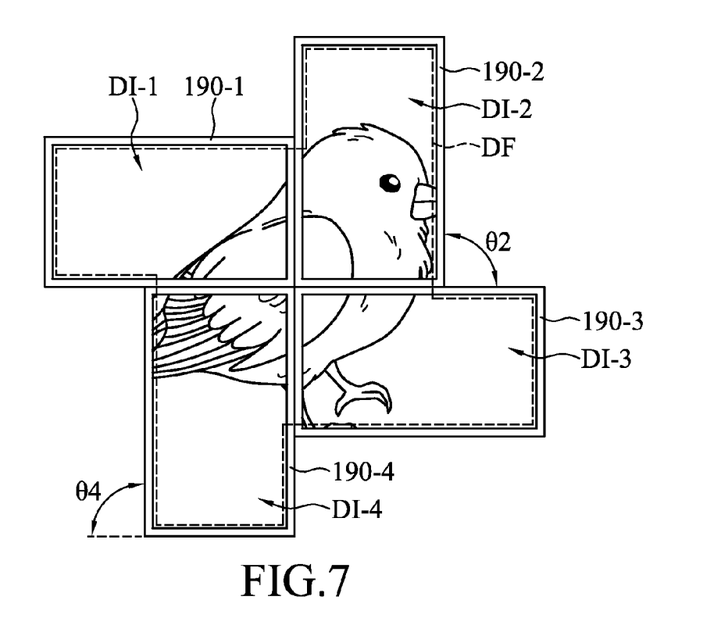
FIG. 7 is a schematic diagram of the second embodiment of the display devices tiled irregularly.
Figure 8:
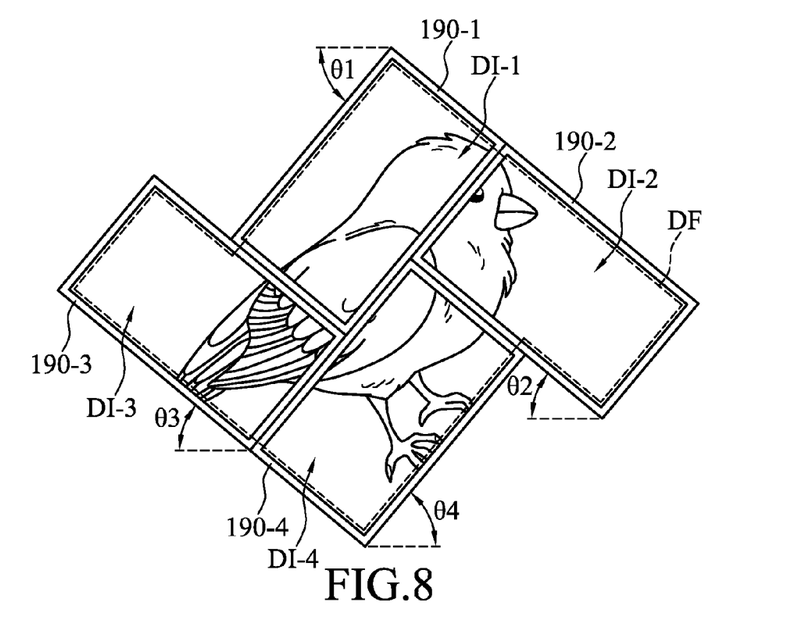
FIG. 8 is a schematic diagram of the third embodiment of the display devices tiled irregularly.
Figure 10:
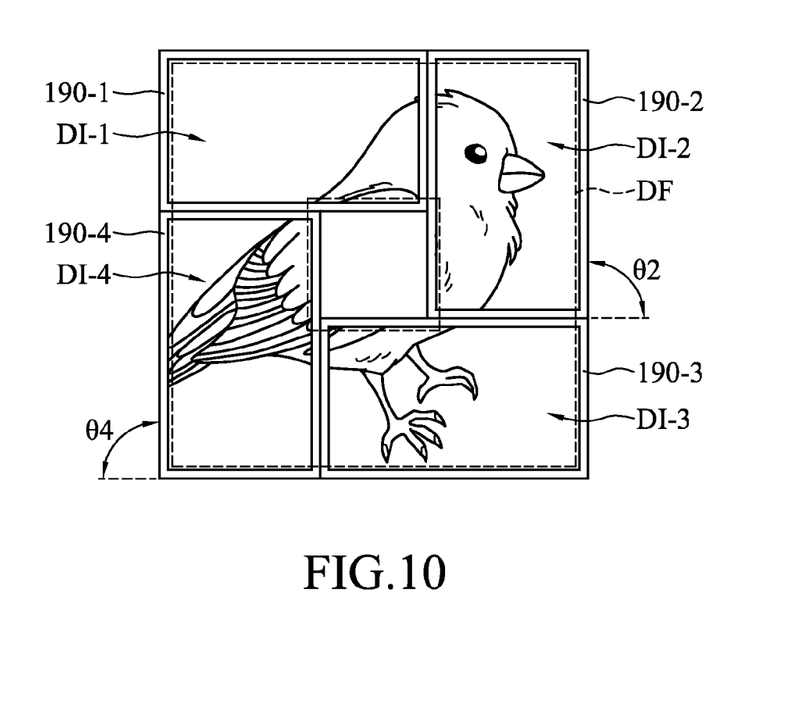
FIG. 10 is a schematic diagram of the fifth embodiment of the display devices tiled irregularly.

In some other embodiments, the rotation angles (Rotation) corresponding to the disposing angles θ1~θ4, respectively, are numerical values and at least one of the rotation angles (Rotation) is different from others, as shown in FIGS. 7,8 and 10.

Take the display devices 190-1~190-4 shown in FIG. 6 as an example, the first image size is 1280×720, the second image size is 640×360, resolution is HDMI, and the setting parameter shown in Table 1.

TABLE 1

|  | 190-1 | 190-2 | 190-3 | 190-4 |
| --- | --- | --- | --- | --- |
| scaling | 0.2 | 0.2 | 0.2 | 0.2 |
| rotation | 45 | 45 | 45 | 45 |

TABLE 1-continued

|  | 190-1 | 190-2 | 190-3 | 190-4 |
| --- | --- | --- | --- | --- |
| shift_x | 0 | 700 | −640 | 40 |
| shift_y | 360 | −450 | −450 | −1230 |

Take the display devices 190-1~190-4 shown in FIG. 10 as an example, the first image size is 1280×720, the second image size is 640×360, resolution is HDMI, and the setting parameter shown in Table 2.

TABLE 2

|  | 190-1 | 190-2 | 190-3 | 190-4 |
| --- | --- | --- | --- | --- |
| scaling | 0.3 | 0.3 | 0.3 | 0.3 |
| rotation | 90 | 0 | 90 | 0 |
| shift_x | −450 | 460 | 336 | −300 |
| shift_y | 733 | −605 | −567 | 725 |

Take the display devices 190-1~190-4 shown in FIG. 7 as an example, the first image size is 1280×720, the second image size is 640×360, resolution is HDMI, and the setting parameter shown in Table 3.

TABLE 3

|  | 190-1 | 190-2 | 190-3 | 190-4 |
| --- | --- | --- | --- | --- |
| scaling | 0.25 | 0.25 | 0.25 | 0.25 |
| rotation | 0 | 90 | 0 | 90 |
| shift_x | 635 | 640 | −633 | −640 |
| shift_y | 360 | 365 | −370 | −362 |

Figure 12:
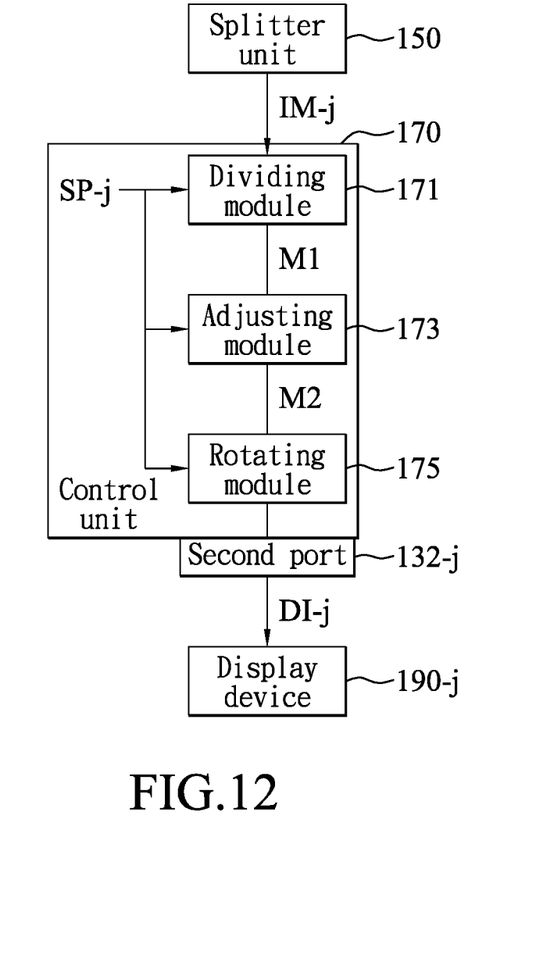
FIG. 12 illustrates a functional block diagram of the first embodiment of a control unit.

In some embodiments, please referring to FIG. 12, each of the control units 170 (namely, one of above-mentioned control units 170-1~170-N) comprises a dividing module 171, an adjusting module 173, and a rotating module 175. The input terminal of the dividing module 171 is electrically connected to the splitter unit 150. The adjusting module 173 is electrically connected between the output terminal of the dividing module 171 and the input terminal of the rotating module 175. The output terminal of the rotating module 175 is electrically connected to the corresponding display devices 190-j through the corresponding second port 132-j. J is an integer of 1 to N. N is the number of the display device 190. The dividing module 171 retrieves the replication image IM-j according to the shift of the corresponding setting parameters SP-j to generate a partial image M1 having a third image size. The second image size is between the third image size and the first image size. The adjusting module 173 generates an adjusted image M2 having the second image size by scaling according to the scale of the corresponding setting parameters SP-j and interpolating the partial image M1. The rotating module 175 rotates the adjusted image M2 to generate the sub-image DI-j according to the rotation angle of the corresponding setting parameters SP-j.

Figure 13:
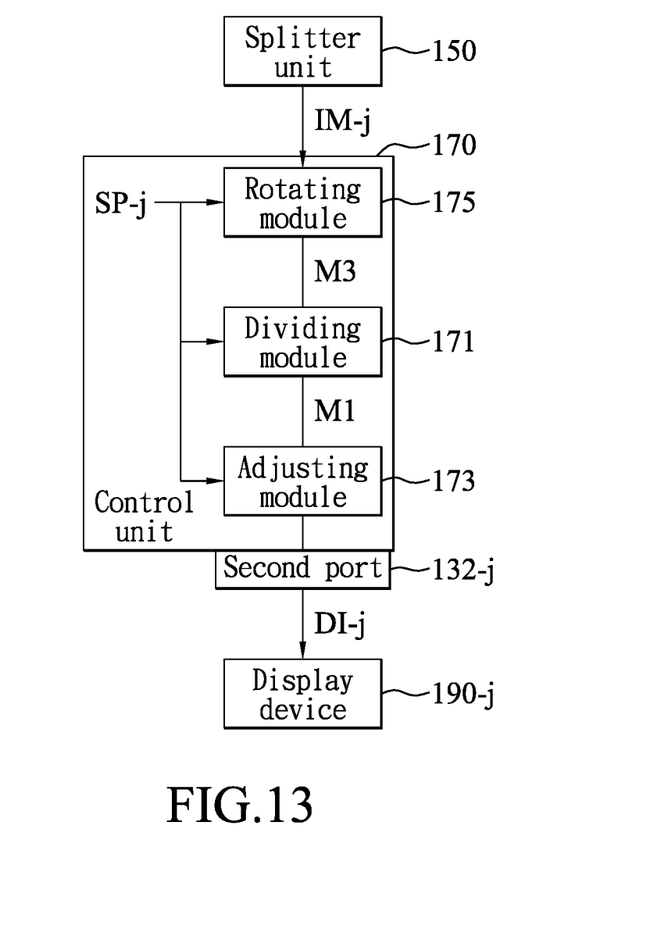
FIG. 13 illustrates a functional block diagram of the second embodiment of a control unit.

In some other embodiments, please refer to FIG. 13, each of the control units 170 comprises a dividing module 171, an adjusting module 173, and a rotating module 175. The input terminal of the rotating module 175 is electrically connected to the splitter unit 150. The dividing module 171 is electrically connected between the output terminal of the rotating module 175 and the input terminal of the adjusting module 173. The output terminal of the adjusting module 173 is electrically connected to the corresponding display devices 190-j through the corresponding second port 132-j. The rotating module 175 rotates the replication image IM-j to generate the rotation image M3 according to the rotation angle of the corresponding setting parameters SP-j. The dividing module 171 retrieves the rotation image M3 according to the shift of the corresponding setting parameters SP-j to generate a partial image M1 having a third image size. The second image size is between the third image size and the first image size. The adjusting module 173 generates a sub-image DI-j having the second image size by scaling according to the scale of the corresponding setting parameters SP-j and interpolating the partial image M1.

Figure 14:
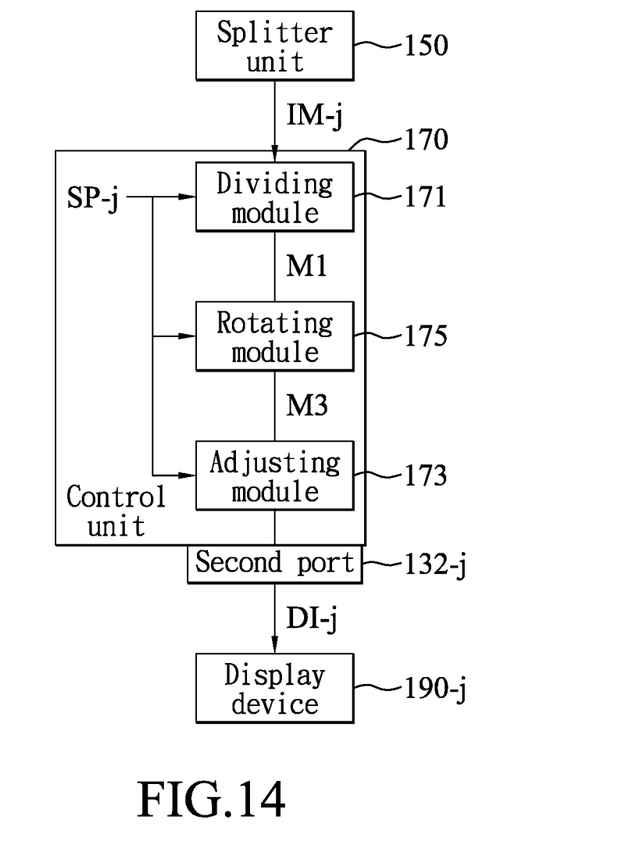
FIG. 14 illustrates a functional block diagram of the third embodiment of a control unit.

In some other embodiments, please refer to FIG. 14, each control units 170 comprises a dividing module 171, an adjusting module 173, and a rotating module 175. The input terminal of the dividing module 171 is electrically connected to the splitter unit 150. The rotating module 175 is electrically connected between the output terminal of the dividing module 171 and the input terminal of the adjusting module 173. The output terminal of the adjusting module 173 is electrically connected to the corresponding display devices 190-j through the corresponding second port 132-j. The dividing module 171 retrieves the replication image IM-j according to the shift of the corresponding setting parameters SP-j to generate a partial image M1 having a third image size. The second image size is between the third image size and the first image size. The rotating module 175 rotates the partial image M1 to generate the rotation image according to the rotation angle of the corresponding setting parameters SP-j. The adjusting module 173 generates a sub-image DI-j having the second image size by scaling according to the scale of the corresponding setting parameter SP-j and interpolating the rotation image M3.

In some embodiments, each of the control units can be AVS (Audio Video Standard) chip.

In some embodiments, the first port 130 is a HDMI port.

In some embodiments, the second port 132-1~132-N can be HDMI ports.

In some embodiments, the data transfer port 134 can be a RS232 port or an USB port.

In summary, the instant disclosure provides a tiling-display system and a method of tiled displaying. The method can be adapted to display a tiled image on display devices tiled irregularly. In addition, the tiling-display system and the method allow a user to input the setting parameters to generate a sub-image for each of the display devices.

While the instant disclosure has been described by way of example and in terms of the preferred embodiments, it is to be understood that the invention needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A tiling-display system, comprising:
   an image source device, for outputting a source image;
   a first port, electrically connected to the image source device;
   a splitter unit, electrically connected to the first port, for receiving the source image via the first port and replicating the source image into a plurality of replication images, wherein each of the replication images and the source image have a first image size;
   a plurality of control units, corresponding to a plurality of groups of setting parameters respectively, for receiving the replication images respectively, each for processing the received replication image according to the corresponding group of setting parameters to generate a sub-image, wherein each of the plurality of groups of the setting parameters comprises a scale, a shift and a rotation angle, the shifts of the plurality of the groups of the setting parameters are different from other group, and each of the plurality of sub-images has a second image size and the rotation angle of the corresponding group of setting parameters; and
   a plurality of display devices, electrically connected to the control units respectively, each of the plurality of display devices receiving and displaying the sub-image generated by the corresponding control unit, wherein each of the plurality of display devices is arranged according to the corresponding rotation angle and the screens of the plurality of display devices display a tiled image.

2. The tiling-display system of claim 1, further comprising:
   a plurality of second ports, corresponding to the control units respectively and corresponding to the display device, each of second ports electrically connected between the corresponding control unit and the corresponding display device, wherein each of the display devices receives the sub-image generated by the corresponding control unit via the corresponding second port.

3. The tiling-display system of claim 1, wherein the image source device is a computing device for outputting the plurality of groups of setting parameters to the control units via a data transfer port.

4. The tiling-display system of claim 1, further comprising:
   a computing device for outputting the plurality of groups of setting parameters to the control units via a data transfer port.

5. The tiling-display system of claim 1, wherein the tiled image is a non-rectangular plane geometric figure.

6. The tiling-display system of claim 1, wherein the rotation angles are the same and not equal to zero.

7. The tiling-display system of claim 1, wherein at least one of the rotation angles is different from others.

8. The tiling-display system of claim 1, wherein each of the control units comprises:
   a dividing module, for retrieving the replication image according to the corresponding shift to generate a partial image having a third image size, wherein the second image size is between the third image size and the first image size;
   an adjusting module, for generating an adjusted image having the second image size by scaling according to the corresponding scale and interpolating the partial image; and
   a rotating module, for rotating the adjusted image to generate the sub-image according to the corresponding rotation angle.

9. The tiling-display system of claim 1, wherein each of the control units comprises:
   a rotating module, for rotating the replication image to generate a rotation image according to the corresponding rotation angle;
   a dividing module, for retrieving the rotation image according to the shift to generate a partial image having a third image size, wherein the second image size is between the third image size and the first image size; and an adjusting module, for generating the sub-image having the second image size by scaling according to the corresponding scale and interpolating the partial image.

10. The tiling-display system of claim 1, wherein each control unit comprises:
 a dividing module, for retrieving the replication image according to the corresponding shift to generate a partial image having a third image size, wherein the second image size is between the third image size and the first image size;
 a rotating module, for rotating the partial image to generate a rotation image according to the corresponding rotation angle; and
 an adjusting module, for generating the sub-image having the second image size by scaling according to the corresponding scale and interpolating the rotation image.

11. A method of tiled displaying, performed by a tiling-display system, the method comprising:
 receiving, by using a splitter unit of the tiling-display system, a source image via a first port;
 replicating, by using the splitter unit of the tiling-display system, the source image into a plurality of replication images, wherein each of the source image and the replication images has a first image size;
 processing, by using a plurality of control units of the tiling-display system, the replication images corresponding to a plurality of groups of setting parameters to respectively generate a plurality of sub-images, wherein each group of the setting parameters comprises a scale, a shift and a rotation angle, the shifts of the plurality of the groups of the setting parameters are different from each other, and each of the sub-images has a second image size and the corresponding rotation angle of the corresponding setting parameters; and
 outputting, via a plurality of second ports of the tiling-display system, the sub-images to a plurality of display devices respectively via a plurality of second ports such that the display devices display the sub-images respectively, wherein each of the plurality of display devices is arranged according to the corresponding rotation angle and the screens of the plurality of display devices display a tiled image.

12. The method of claim 11, wherein the rotation angles are the same and not equal to zero.

13. The method of claim 11, wherein at least one of the rotation angles is different from others.

14. The method of claim 11, wherein the processing the replication images comprises:
 retrieving the replication image according to the corresponding shift to generate a partial image having a third image size, wherein the second image size is between the third image size and the first image size;
 generating an adjusted image having the second image size by scaling according to the corresponding scale and interpolating the partial image; and
 rotating the adjusted image to generate the sub-image according to the corresponding rotation angle.

15. The method of claim 11, wherein the processing the replication images comprises:
 rotating the replication image to generate a rotation image according to the corresponding rotation angle;
 retrieving the rotation image according to the corresponding shift to generate a partial image having a third image size, wherein the second image size is between the third image size and the first image size; and
 generating the sub-image having the second image size by scaling according to the scale and interpolating the partial image.

16. The splicing display method of claim 11, wherein the processing the replication images comprises:
 retrieving the replication image according to the corresponding shift to generate a partial image having a third image size, wherein the second image size is between the third image size and the first image size;
 rotating the partial image to generate a rotation image according to the corresponding rotation angle; and
 generating the sub-image having the second image size by scaling according to the scale and interpolating the rotation image.

* * * * *